United States Patent [19]

Gilb

[11] Patent Number: 4,560,301

[45] Date of Patent: Dec. 24, 1985

[54] HEAVY SLOPE AND SKEW SHEET METAL HANGER AND METHOD OF MAKING SAME

[75] Inventor: Tyrell T. Gilb, Berkeley, Calif.

[73] Assignee: Simpson Strong-Tie, Company, Inc., San Leandro, Calif.

[21] Appl. No.: 567,537

[22] Filed: Jan. 3, 1984

[51] Int. Cl.$^4$ ............................................. F16B 9/00
[52] U.S. Cl. .................................. 403/232.1; 403/3; 403/403; 52/702
[58] Field of Search ................. 403/232.1, 11, 3, 187, 403/403, 14; 52/712, 702, 92

[56] References Cited

U.S. PATENT DOCUMENTS

| | | |
|---|---|---|
| 508,280 | 11/1893 | Cavallaro . |
| 753,053 | 2/1904 | Eberhart . |
| 2,990,590 | 7/1961 | Graveley . |
| 3,036,347 | 5/1962 | Findleton . |
| 3,423,898 | 1/1969 | Tracy et al. . |
| 3,481,635 | 12/1969 | Tracy . |
| 3,596,941 | 8/1971 | Tracy . |
| 3,752,512 | 8/1973 | Gilb ................................ 403/232.1 |
| 3,945,741 | 3/1976 | Wendt ................................ 403/232 |
| 4,144,683 | 3/1979 | Dean ................................ 52/182 |
| 4,158,940 | 6/1979 | Lancelot, III et al. ............... 52/702 |
| 4,229,915 | 10/1980 | Snow et al. ..................... 403/403 X |
| 4,230,416 | 10/1980 | Gilb ................................ 403/232.1 |
| 4,261,155 | 4/1981 | Gilb ................................ 52/702 |
| 4,291,996 | 9/1981 | Gilb ................................ 403/14 |
| 4,353,664 | 10/1982 | Gilb ................................ 403/232.1 |

FOREIGN PATENT DOCUMENTS

| | | |
|---|---|---|
| 2611236 | 9/1977 | Fed. Rep. of Germany ........ 52/702 |
| 2744523 | 4/1978 | Fed. Rep. of Germany ... 403/232.1 |

Primary Examiner—Cornelius J. Husar
Assistant Examiner—Todd G. Williams
Attorney, Agent, or Firm—James R. Cypher

[57] ABSTRACT

A method of making an infinite number of hangers from a single sheet metal blank. The hangers are for connecting wood sawn and "I"-type members in the building construction industry. The hanger may be bent to form left and right skew hangers, up and down sloping hangers, and carry supported members of different widths as well as heights. By inserting spacers in the die, hangers of different heights, top flange and top tilted flange hangers may be provided. The design uses a hinged seat and an asymmetrical seat and back plate member. Tab members are outwardly turned and the tabs are constructed from a portion of the back plate member.

8 Claims, 17 Drawing Figures

HEAVY SLOPE AND SKEW SHEET METAL HANGER AND METHOD OF MAKING SAME

BACKGROUND

This invention relates to sloped and skewed hangers in the heavier load ranges which is defined as loads in the 2000 to 3500 lb. range.

The wood frame construction industry has used right angled sheet metal framing hangers for many years in substantial quantities in these heavier load ranges. Where skewed or sloped hangers were required, the connector industry provided custom made labor intensive welded hangers which were costly and sometimes required long lead times if substantial quantities were ordered.

In recent years as architectural changes in building construction have occurred, demand for angled and skewed heavier hangers has risen greatly but the connector industry has been unable to provide a hanger which can approach the economies of mass produced right angle sheet metal hangers.

Since a skewed hanger can vary from 30° right to 30° left with an infinite number of angles therebetween and a sloped hanger can vary from 30° up to 30° down with an infinite number of angles therebetween, the initial problem of providing a single sheet metal hanger to meet even this criteria is formidable.

Added to this list of requirements is the need for hangers which can be face mounted as well as top flange mounted and the problems really begin to multiply. Further, there are a substantial number of hangers used in sloping roofs which require the top flange to be angled from a 30° slope in one direction to a 30° slope in the opposite direction.

In my search for solutions to the problem, I found that I could not simply work with heavier gauges of existing sheet metal hangers since it would require the use of heavier gauge materials than would be commercially feasible. Further, a heavier gauge radically decreased the potential for a single blank width concept. In searching for a new configuration I decided to attempt to meet one further parameter that to my knowledge has never been attempted in even lighter load hangers, viz; a sheet metal hanger capable of meeting all of the above parameters and in addition be capable of supporting wood members of different thicknesses as well as different vertical height dimensions.

SUMMARY OF THE INVENTION

The hanger of the present invention begins as a constant width sheet metal blank, preferably from a constant width sheet metal coil. The coil is cut to varying lengths depending on the required hanger height, the need for a top flange, or the need for a tilted top flange. A single die with variable spacers enables the height accommodation to be met. Different cut lines are made depending upon whether the hanger is to be face mounted or top mounted with a flange. Further, a different cut is made depending upon whether the top flange is to be tilted and to what degree of tilt. All other portions of the hanger remain constant for all of the various hanger configurations. It has been calculated that if the slope, skew, and tilt were varied by increments of 5 degrees and the supported member varied by increments of $\frac{1}{2}$ inch from 2.3" to 3.5" and height increments of $\frac{1}{2}$" from $11\frac{1}{8}$" to 16", using only two different gauges of metal, about 50,000 different hangers could be made from the same basic die.

Since separate tooling for even a limited number of the 50,000 possible different hangers would be prohibitive, the main objective was to find a hanger design which could be made from one basic die which could be modified by the addition or deletion of simple spacers.

Since even a simple width variation in the seat in conventional hangers requires separate tooling, as well as a different coil width, the ability of the present design to make over 50,000 hangers from the same tooling and coil width sets the present design apart from present industry state-of-the-art designs. The breakthrough came by discarding all symmetrical solutions and adopting an asymmetrical design. The non-symmetrical design permitted the use of sufficient width at the seat bend line to prevent seat bend line failure which had heretofore been limiting. Thus, with a single width at the seat bend line, a single hanger of the present design can carry supported members of varying widths and varying loads.

It was found that the use of inwardly turned tabs found on previous hangers, although suitable for lighter loads did not resist the heavier load forces adequately; -failing in excessive buckling. The solution was the use of outwardly turned tabs with the metal forming the tabs taken from the back plate of the hanger.

With an asymmetrical design, varying seat width and outwardly turned tabs, the problem of providing right and left skew angles turned out to be surprisingly unique. The opposite skew was obtained by the method of reversing the sheet metal blank forming all the bends in the opposite direction and creating a mirror image hanger. While the technique of a mirror image method is not per se new, given the unique structure of this hanger, the fact that mirror image could be used at all could not have been predicted.

A further feature of the present hanger is the ability to create field bends to slope the seat either up or down. Since most hangers require a 90° bend it is desirable to make this bend at the factory. Rebending, however, in the field along the same bend line could result in metal fatigue and failure at the bend line. The solution was to provide embossments in the lower bank area which terminated in the seat area and to make the factory bend within and near the termination points of the embossments. By providing a break in the embossments and thereby providing an unembossed area, a field bend could be made offset from the factory bend line in this unembossed area.

As stated above, the top tabs of inwardly turned configuration hangers did not resist the higher load forces adequately due to excessive buckling and further, the body of the device at the intersection with the top tabs had an inherent "buckle line". The body buckle problem resulted from a break in the continuity of bend lines in the back area at the point of beginning of the tabs, however configured, and particularly if the tab material was taken from the outboard legs of the back. This was particularly true if the device was symmetrical, essentially requiring that the tabs be removed from the outboard legs because insufficient area existed inboard of the body bend lines.

The new concept of the eccentric device, using the blank on a turned over basis to provide lefts or rights, was the new basis making it possible to tackle the problem in a new way, and to make available enough material inside the body bend lines for the tab function.

The solution, after study, turned out to be to use the problem of the tabs as a solution for the body buckle problem, thus solving both problems. The very elongated bend line of the acute tab provides the necessary resistance to body buckle on that side, while the very long (staggered in relation to the acute tab bend line) bend line for the wide side tab provides the buckle resistance on the other side, with both bend resistances tending to support each other. Practical arm of moment torque action on the body under load concentrated this buckle problem about 1 to 3 inches from the top, particularly in top flange models. This torque buckle resistance extends down some 5½ inches minimum by this method, solving the problem. The solution was enchanced by the detail shapes given to the tabs, particularly the downwardly disposed longer tab on the wide side wherein this conformed to load directions, preventing secondary buckling near ultimate load levels.

The top flange versions of the hanger can be provided in either a conventional 90 degree aspect, or incorporate top flange tilt either way up to about 30 degrees. The basic nail pattern is 8 nails (4 in the top flange and 4 in the faces) to attain the needed values. In addition, an optional 2 nail pattern is provided at the top flange corner for a 45 degree angle use for enchanced values if wanted. Bossed patterns contribute some value, but inhibit the use of the tilt alternate.

The design set forth in the present description is not only compatable for the immediate blanking plus secondary bending operations type production, but is also suitable for full automation, computer controlled production. Thus, upon receipt of each custom order, the fully automatic machinery could be programmed to cut and bend the required number of hangers of each given slope, skew, face mounted, top flange 0 degree or top flange tilt, variable seat width and variable height to order.

To insure computer design fully automated capability, the following items are constant: First, the seat area is a production constant for all models, types and gauges. Second, the combined upper area, tabs and associated provisions remain constant for all models, type, and gauges. Third, the blank width is a constant.

The only variables are the height dimension and the gauge; reducing the production problem to a practical product capable of producing an infinite number of types, skews, slopes, top flange or non-top flange, variable top flange widths and angles from essentially a common blank and common cut elements.

This has made possible a product with a fixed seat area, requiring only the (total area) movement of the upper area, and punch adjustments, bends-constant, and the tab area-bends constant in relation to the back plane. This reduces the potential bend variable to the angle of skew desired only.

It is possible to eliminate welded custom made skewed, sloped and tilted hangers by providing custom bend sheet metal hangers from differently sized and cut blanks. It is believed, however, due to the great numbers of different dies and tooling and inventory control problems this would create, there would be no net gain, particularly at the present volume levels.

The present design reduces subtantially all of the infinite variables to essentially one variable; height.

Further, while providing a height variable is some trouble in the early "blank and secondary bend" stage of production, it has been designed in such a way as to permit full automatic production of a specific sub-product of any height as soon as the volume, or net cost savings dictates.

The product line starts as a coil of 8.75" width fed into a straight sided press. Actual fabrication, automated, would require a transfer 90 degrees type die to avoid the alternate brake type die sequence of excessive length). As the two essential areas of the product have been developed as constants, and their space-relationship establishes the height of the product, automation of the total area is possible.

Other general objectives of the present invention are as follows:

1. The final product does not require any weld operations.
2. The product line is based upon a minimum number of blanks in spite of the almost infinite number of widths, heights, slopes, skews, top flanges and slope flanges required.
3. In general, the product is in the 2000 pound to 3500 pound load use.
4. The hanger can handle sawn purlins as well as all the common heavier and deeper fabricated "I" type joists as made by all existing fabricators.
5. The product must be cost-effective both for the manufacturer and its customers.
6. The product must be significantly less expensive to produce over custom welded hangers to justify the substantial costs of research and development and costly dies and dedicated equipment.

DESCRIPTION OF THE PREFERRED EMBODIMENTS

Figure 3:
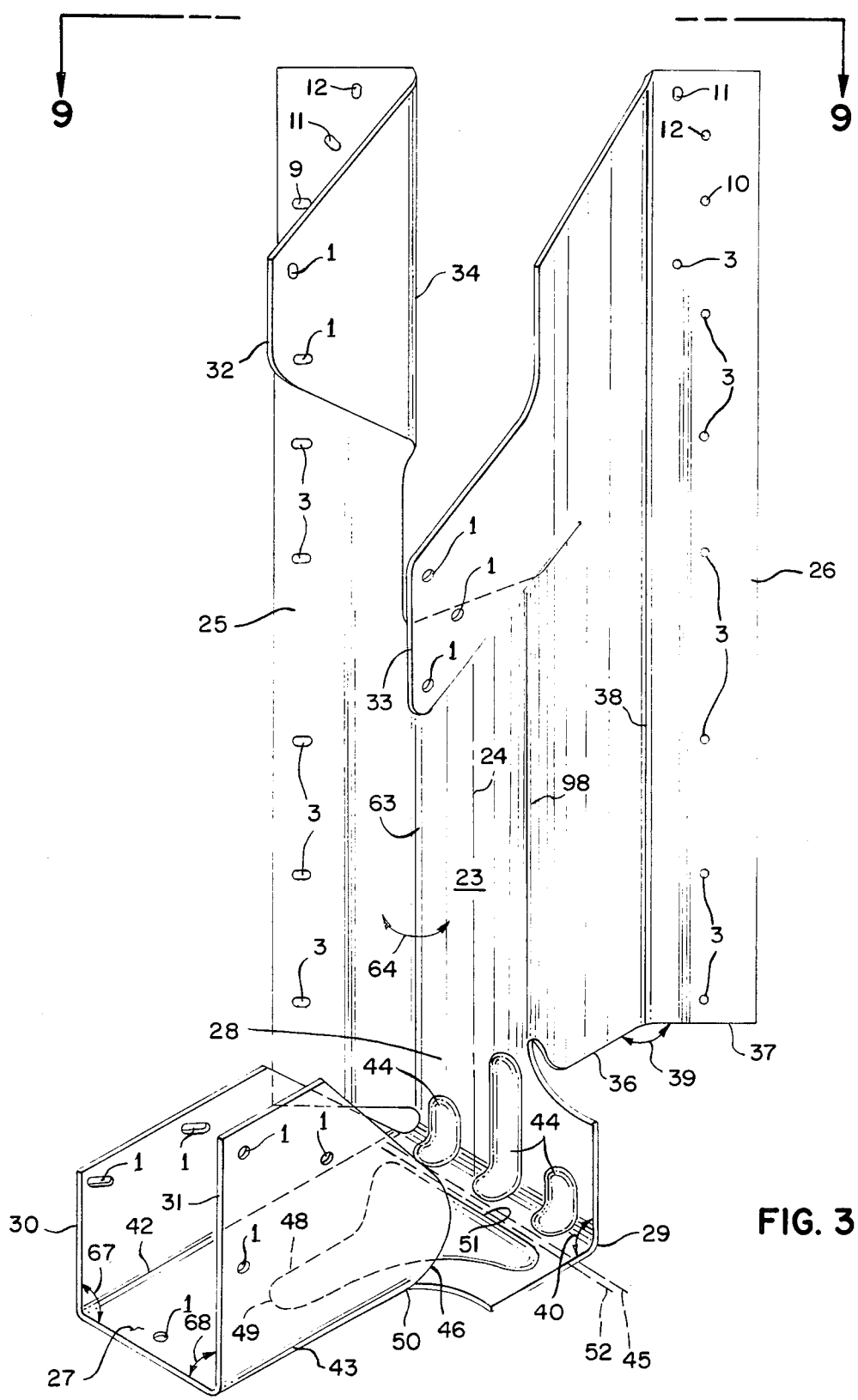
FIG. 3 is a left skewed face mounted hanger constructed from essentially the same blank shown in FIG. 16.
Figure 4:
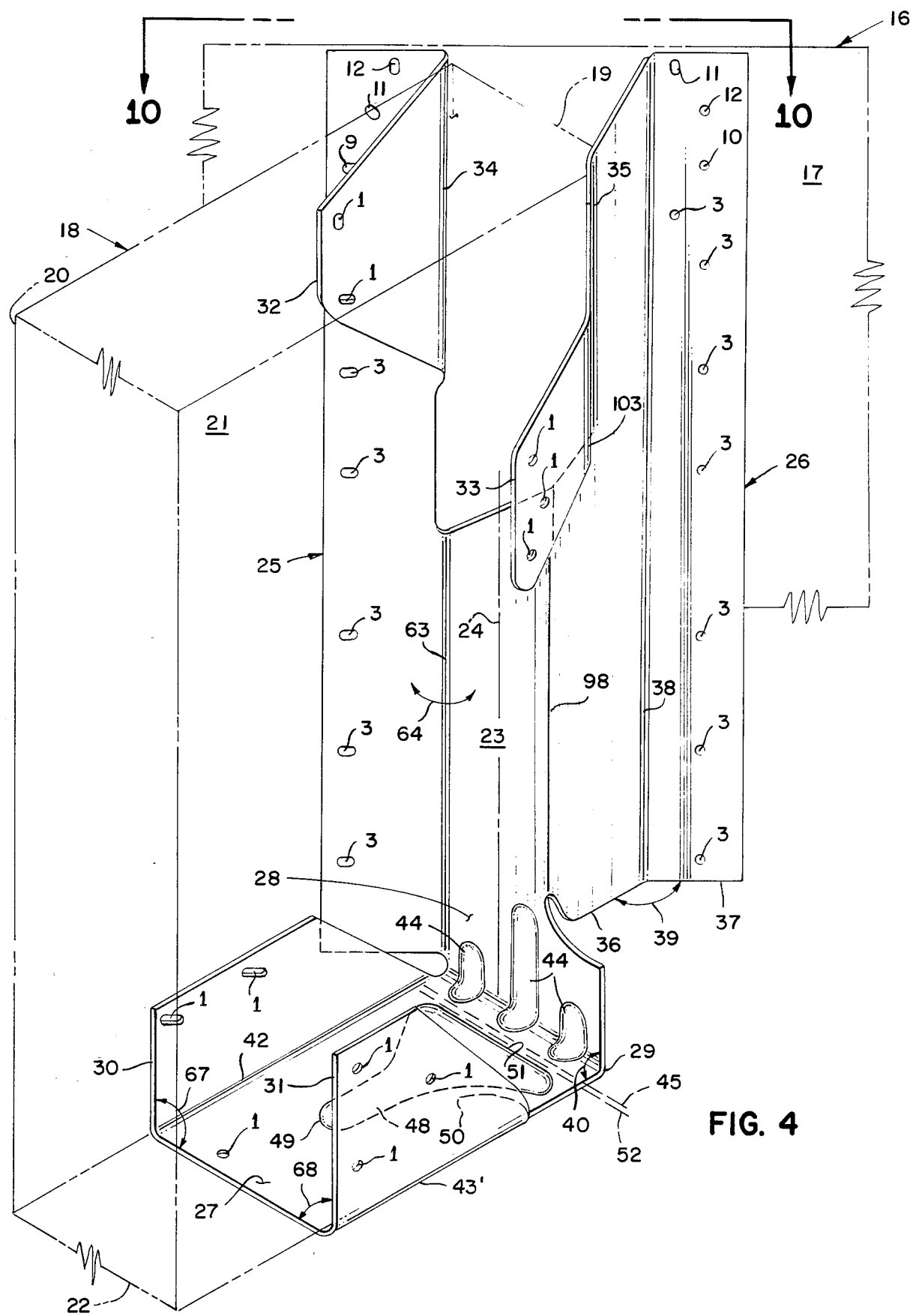
FIG. 4 is a left skewed face mounted hanger constructed essentially from a blank shown in FIG. 16. The hanger is identical to the hanger shown in FIG. 3 except that the seat and second tab have been bent to accomodate a larger supported member.

Referring to FIGS. 3 and 4, the sheetmetal slope and skew heavier hanger connector of the present invention for a frame building structure consists briefly of a wood supporting member 16 having a generally planar front face 17; a wood supported member 18 having a generally planar end face 19, generally planar side portions 20 and 21 intersecting said end face, and a bottom edge face 22; an elongated back plate member 23 having a longitudinal axis 24 adapted for registration with the front face 17 of the wood supporting member 16; first and second side support members 25 and 26 integrally attached to opposite sides of back plate 23, formed with a plurality of fastener openings 3 and adapted for connection to face 17 of supporting member 16; a seat base 27 integrally connected to an end 28 of back plate 23 along a seat bend line 29 and extending at an angle 40 therefrom a selected distance and adapted for registration with bottom edge face 22 of wood supported member 18; a pair of seat sides 30 and 31 integrally connected to opposite sides of seat base 27 and extending generally parallel to each other and angularly to seat base 27 and each formed with fastener openings 1 at a selected distance from seat bend line 29 and from seat base 27 and adapted for connection to side portions 20 and 21 of wood supported member 18; and first and second tab members 32 and 33 formed from back plate member 23, connected to first and second side support members 25 and 26 along variable first and second tab bend lines 34 and 35 adjacent back member 23 and extending generally parallel to each other and angularly to back member 23 and each formed with fastener openings 1 at selected distances from back plate 23 and adapted for connection to side portions 20 and 21 of wood supported member 18.

Each of the tab members 32 and 33 have a length substantially as great as the width of back plate member 23; the first tab 32 is connected to first side support member 25; and second tab 33 is connected to second side support member 26.

Second side support member 26 has a width greater than the width of first side support member 25 and is divided into inner and outer side panels 36 and 37; outer side panel 37 is formed with fastener openings 3, 10, 11 and 12 and is adapted for connection to face portion 17 of wood supporting member 16; and inner panel 36 is connected to outer panel 37 along a panel bend line 38 parallel to logitudinal axis 24 of back plate member 23 and is connected to back panel member 23 along a portion of its length.

The inner and outer side panels 36 and 37 are formed at a selected angle 39 at panel bend line 38; and first side support member 25 and outer side panel 37 are formed on a plane parallel to front face 17 of wood supporting member 16 for flush mounting there against.

Figure 5:
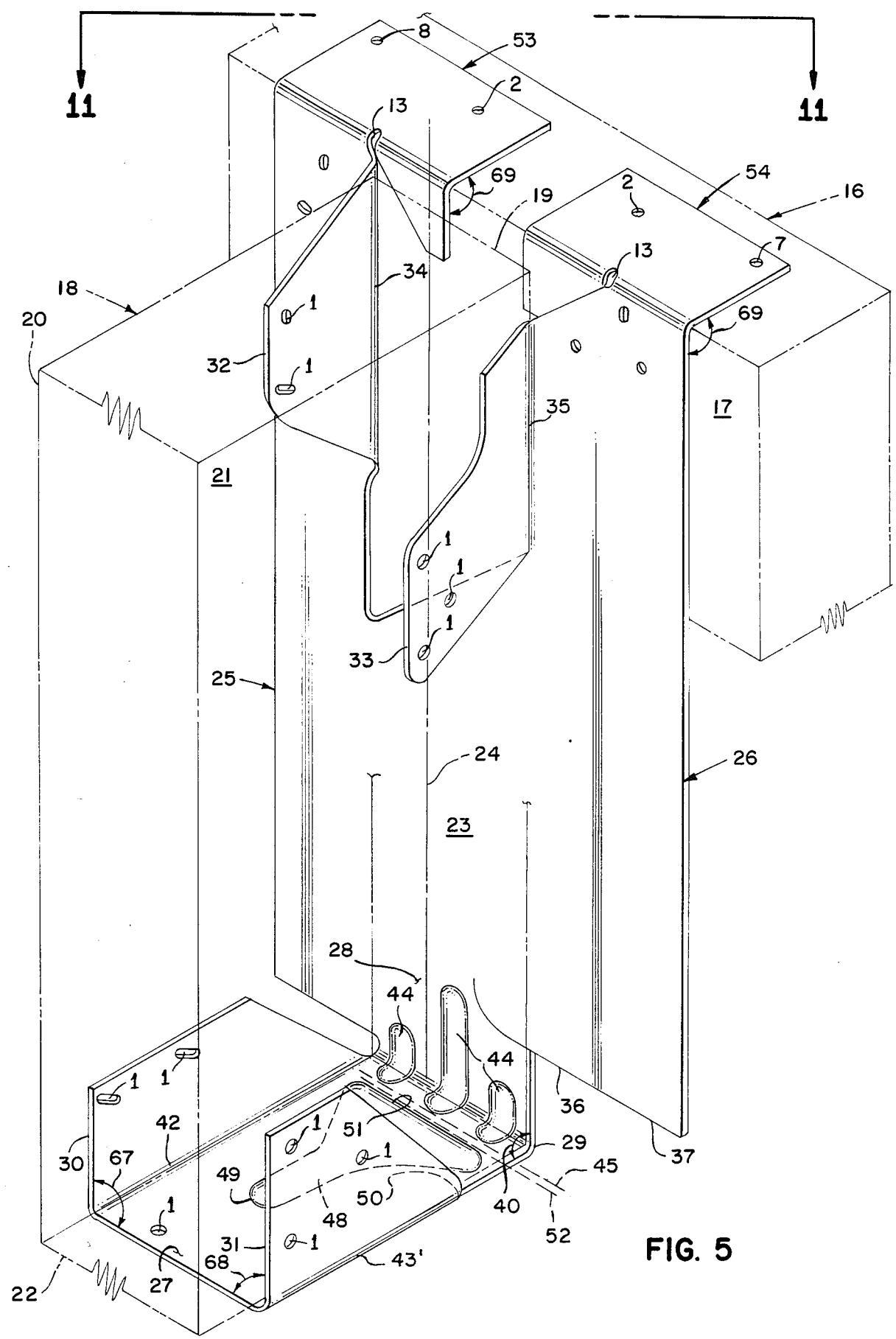
FIG. 5 is a right angled top flange hanger constructed from the blank shown in FIG. 16. The seat and second tab have been bent to accomodate a large supported member.

Referring to FIGS. 4 and 5, second tab 33 is formed with an auxiliary bend line 103 which is parallel to the variable second tab bend line 35 and located a selected distance therefrom. The auxiliary bend line is utilized where a supported member greater in width than the back member is supported at a skewed angle to the supporting member.

Another feature of the present invention is the variable width seat base 27 integrally connected to an end 28 of back plate 23 along a selected angle 40 at transverse seat bend line 29 and extending angularly therefrom a selected distance and adapted for registration with bottom edge face 22 of wood supported member 18 with first and second seat sides 30 and 31 integrally connected to opposite sides of seat base 27 along a first fixed seat side bend line 42 and a second variable seat side bend line 43 and extending generally parallel to each other and angularly to seat base 27 and each formed with fastener openings 1 at a selected distance from seat bend line 29 and from seat base 27 and adapted for connection to side portions 20 and 21 of wood supported member 18. Note that in FIGS. 4, 5 and 6 where the wood supported member 18 is wider than back plate member 23, the second variable seat side bend line is moved outwardly from first fixed seat side bend line 42 and is indicated as 43'. Selected angle transverse seat bend line 29 has a width greater than the effective width of seat base 27. First seat side 30 is connected to seat base 27 along first fixed seat bend line 42. Second seat side 31 is connected to seat base 27 along second variable seat bend line 43. Second variable seat bend line 43 is parallel to first seat bend line 42 and is selectably located a distance from first fixed seat bend line 42 corresponding to the thickness of supported member 18.

Referring to FIGS. 13, 14, 15 and 16, a further feature of the present hanger is the ability to make field bends in the hinged seat. Thus the supported member can be attached at any slope angle 47 or 47' between approximately 30° up slope or 30° down slope. The enabling structure includes: A lower portion of back plate 28 formed with a plurality of transversely spaced axially extending fixed seat bend line embossments 44 which extend across selected angle transverse seat bend line 29 and terminate in a generally straight selected transverse line 45 in seat base 27 adjacent selected angle transverse seat bend line 29. Second seat side 31 has an inner edge 46 terminating at second variable seat bend line 43 and outwardly of selected angle transverse seat bend line 29. Seat embossment 48 is formed in seat base 27 extending from a distal point 49 in seat base 27 extending past the intersection 50 of second seat side 31 and said seat base 27 and terminating in an elongated seat transverse line 51 spaced from and parallel to selected transverse line 45. Field bend line 52 extends transversely of seat base 27 located between and parallel to selected transverse line 45 and elongated seat transverse line 51.

Since field bends are made along line 52 rather than factory bend line 29, the problem of weakening the hanger by rebending along the same line is eliminated.

Figure 1:
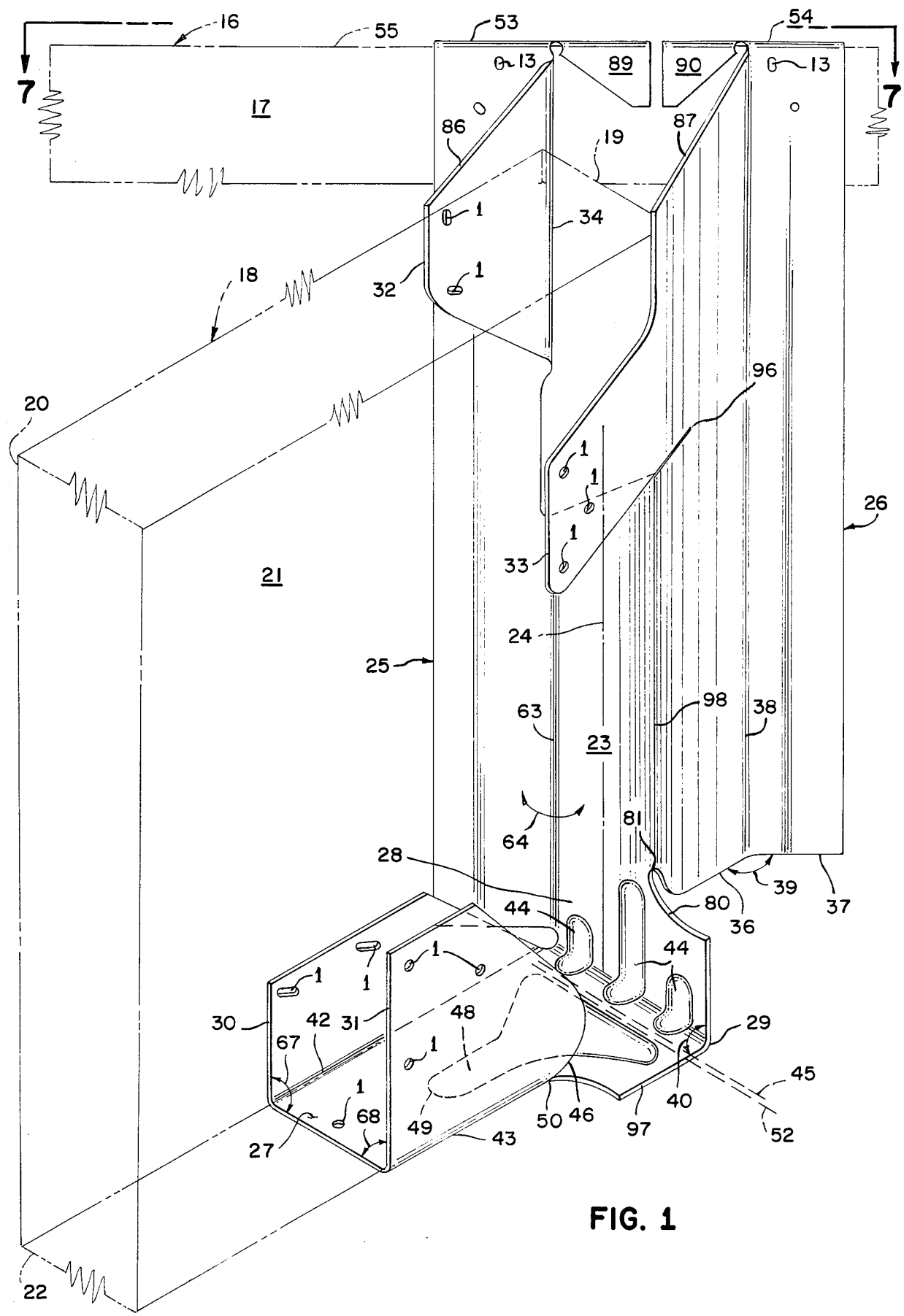
FIG. 1 is a perspective view of a left skewed top flanged hanger constructed in accordance with the present invention. Lines shown in phantom represent supporting and supported members. The hanger is constructed from the blank shown in FIG. 16.
Figure 2:
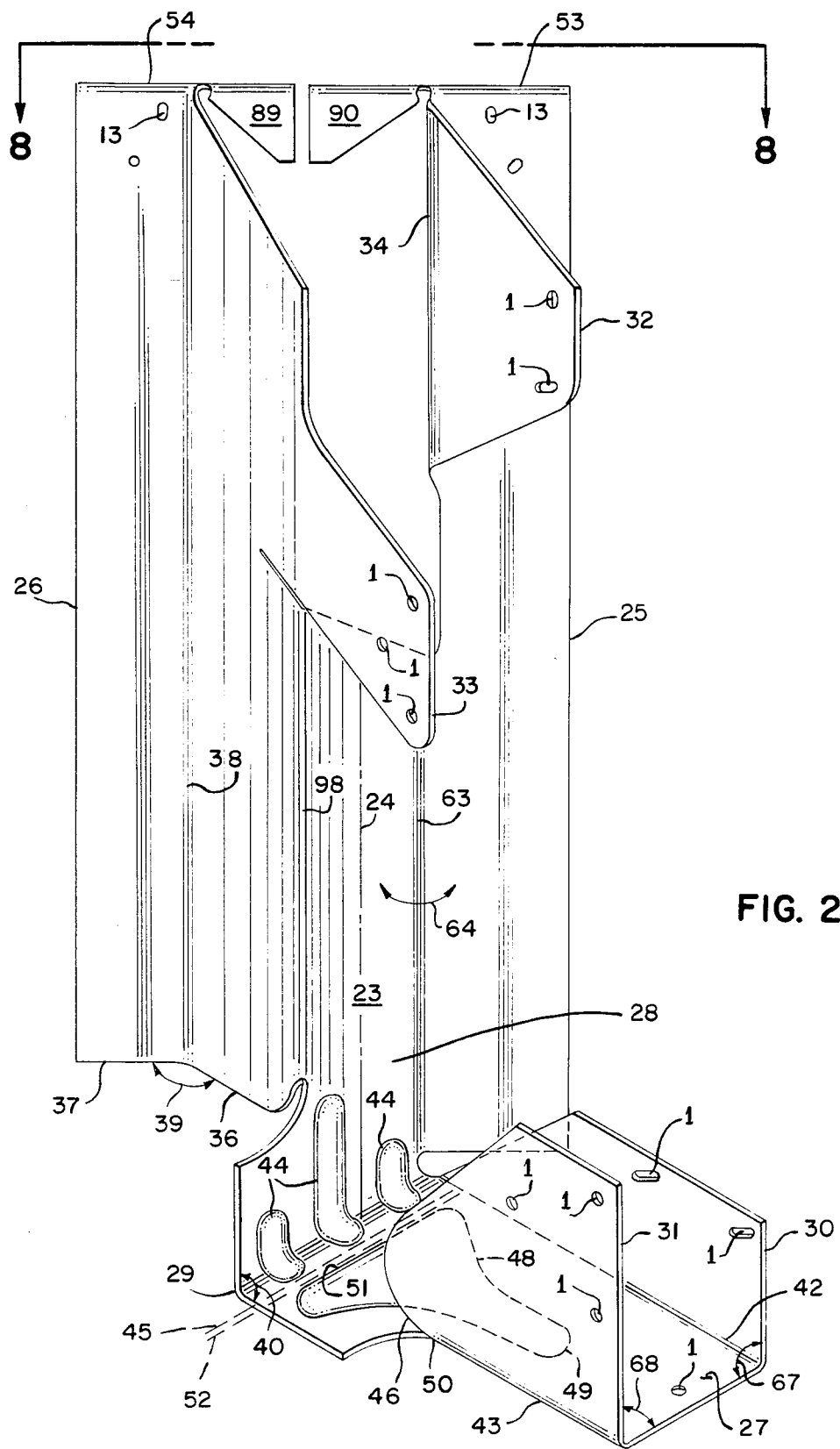
FIG. 2 is a right skewed top flanged hanger and is a mirror image of the hanger shown in FIG. 1 and constructed from the same blank shown in FIG. 16.

Another form of the sheetmetal slope and skew hanger connector of the present invention is shown in FIGS. 1, 2, and 5. The hangers are similar to the hangers shown in FIGS. 3 and 4 and like parts are given identical numbers. The description of identical parts is not repeated. First and second top flange members 53 and 54 are connected respectively to first and second side support members 25 and 26 and formed with fastener openings 2, 7 and 8 and adapted for attachment to the top face 55 of supporting member 16.

Figure 6:
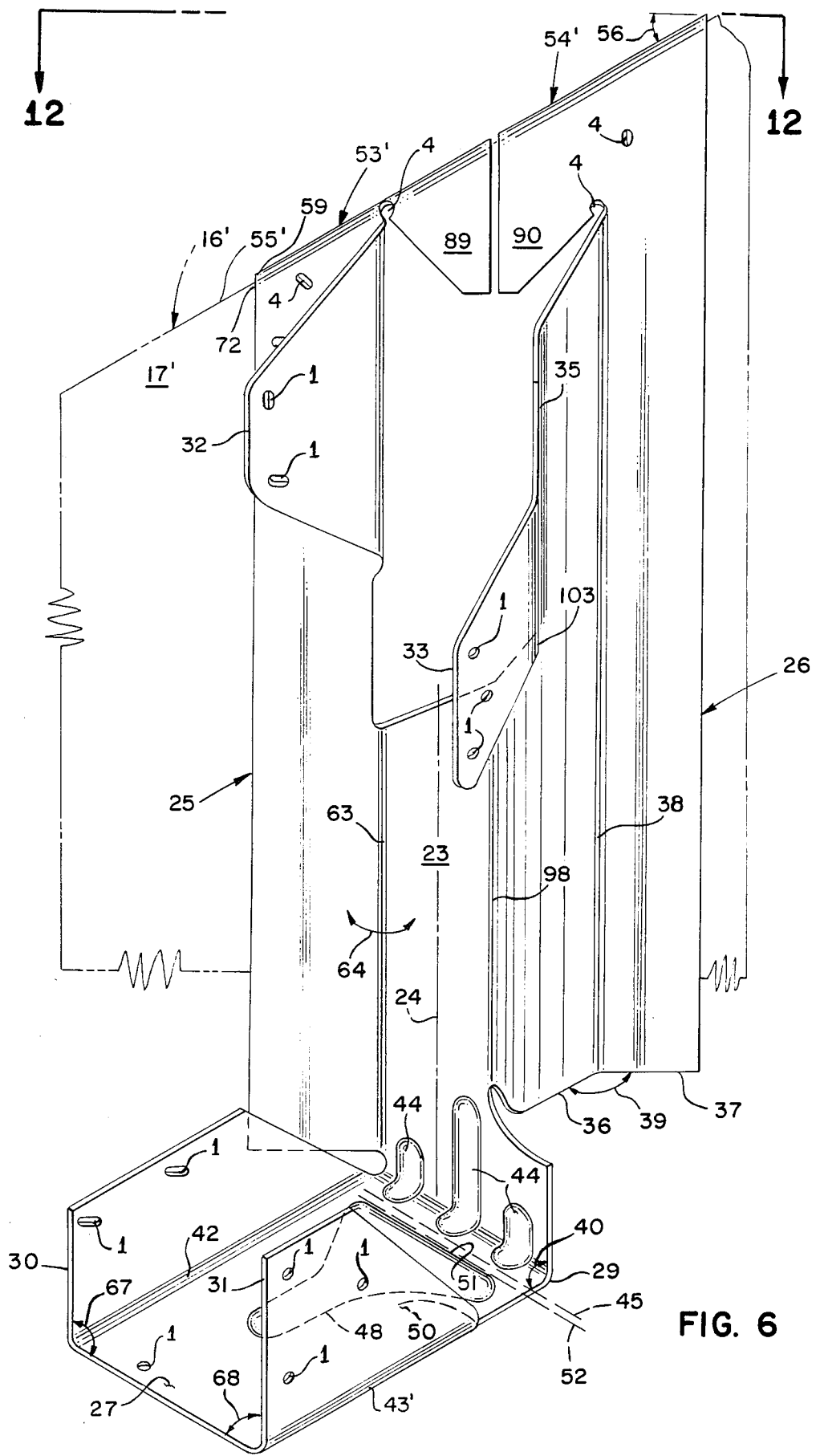
FIG. 6 is a right skewed hanger with a tilted top flange. The hanger is constructed from the blank variation shown in FIG. 17. The seat and second tab have been bent to accomodate a large supported member. The lines shown in phantom represent supported and supporting wood members.
Figure 12:
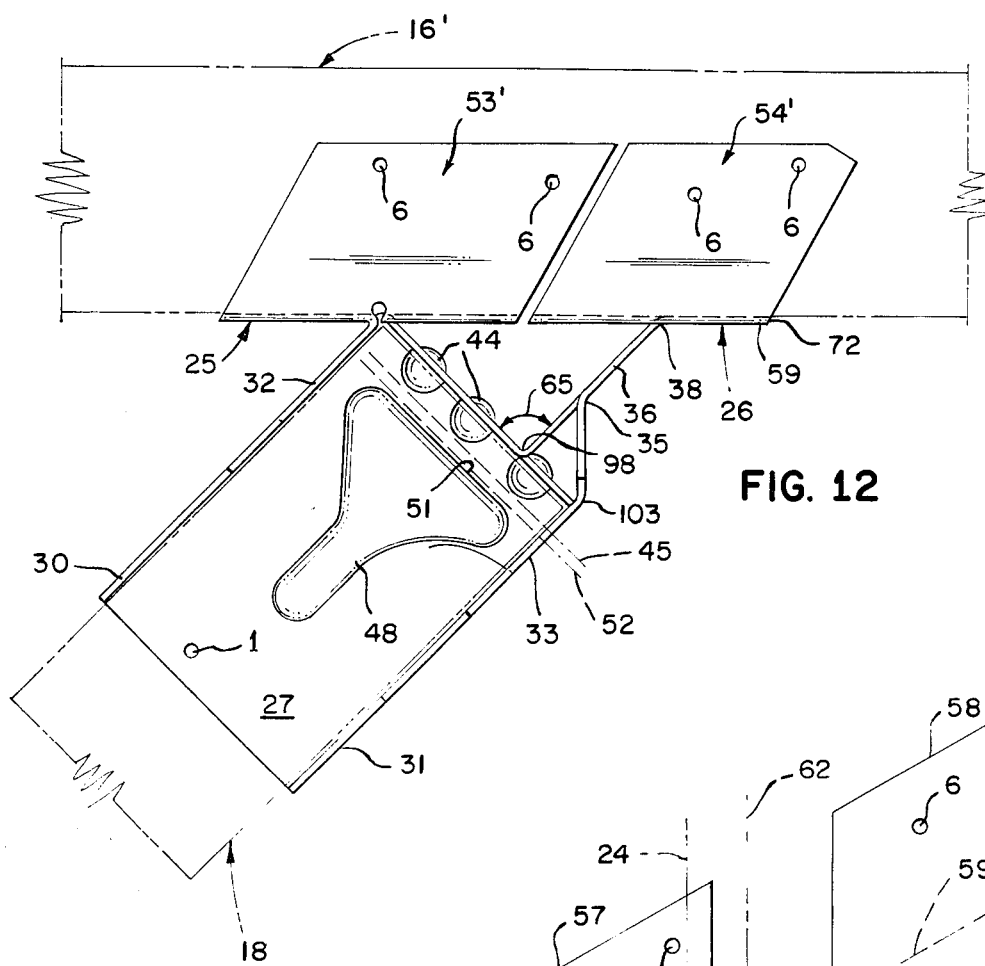
FIG. 12 is a top plan view of the hanger shown in FIG. 6 taken along the line 12—12.
Figure 17:
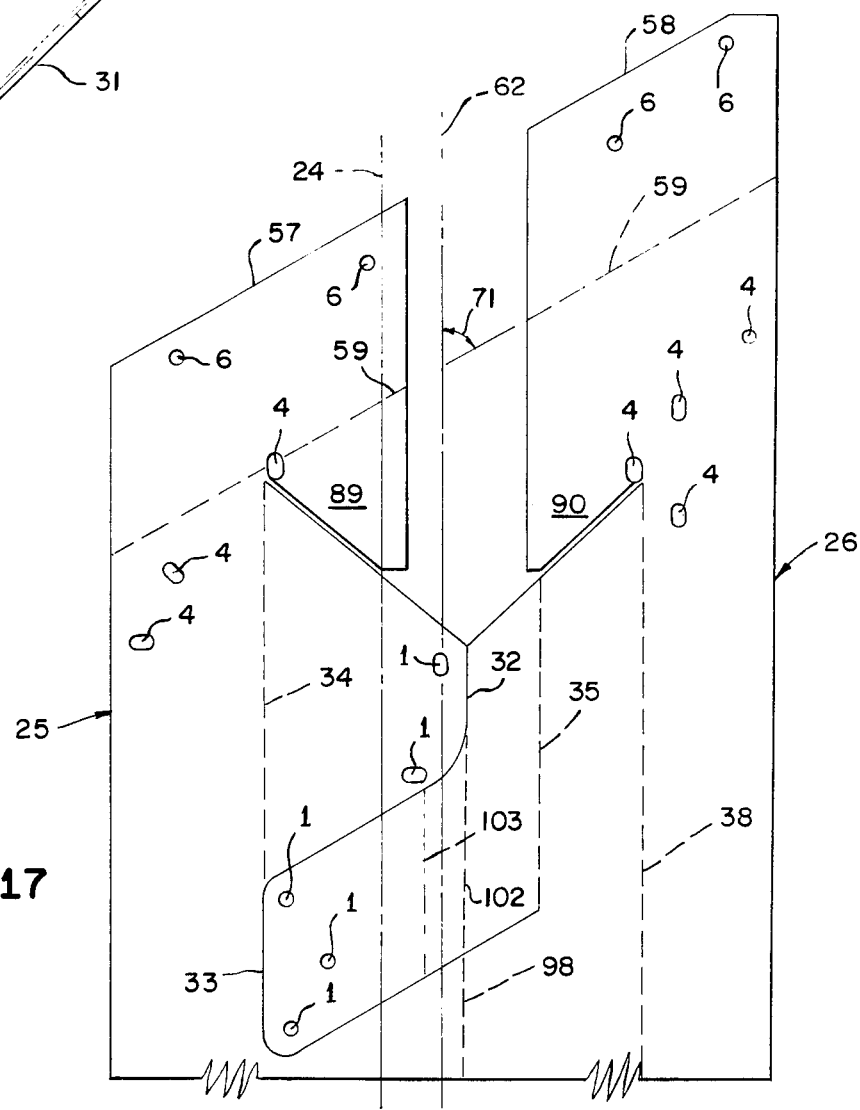
FIG. 17 is a top plan view of a portion of an alternate form of blank member from which the hangers shown in FIGS. 6 and 12 are constructed.
Figure 13:
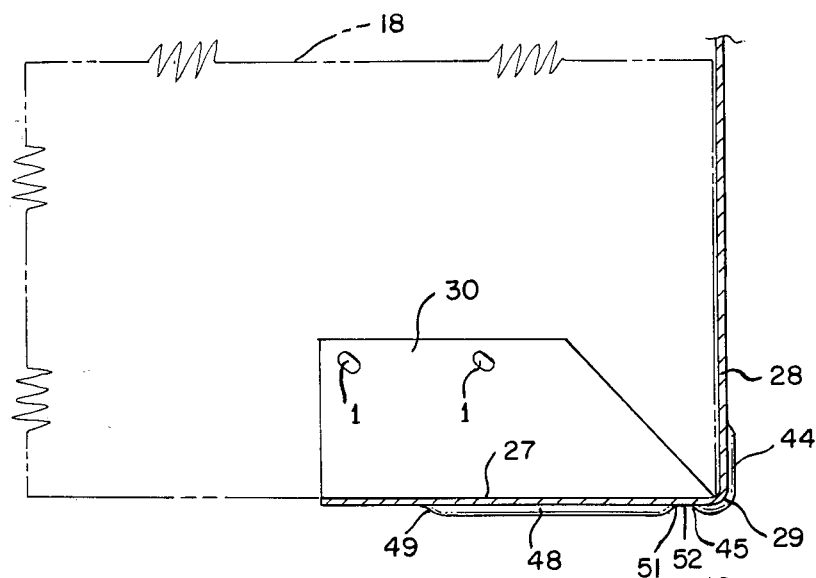
FIG. 13 is a cross section of a portion of the hanger shown in FIG. 7 taken generally along line 13—13.
Figure 14:
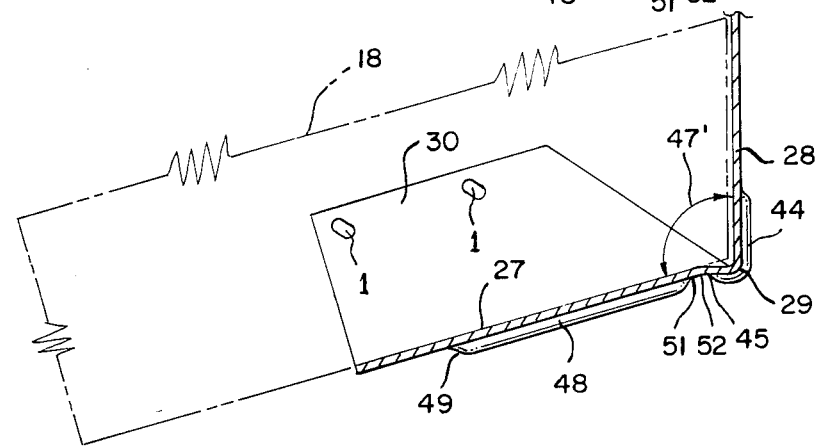
FIG. 14 is a cross sectional view of the same portion of the hanger shown in FIG. 13 but showing an alternate down slope form of the hanger.
Figure 15:
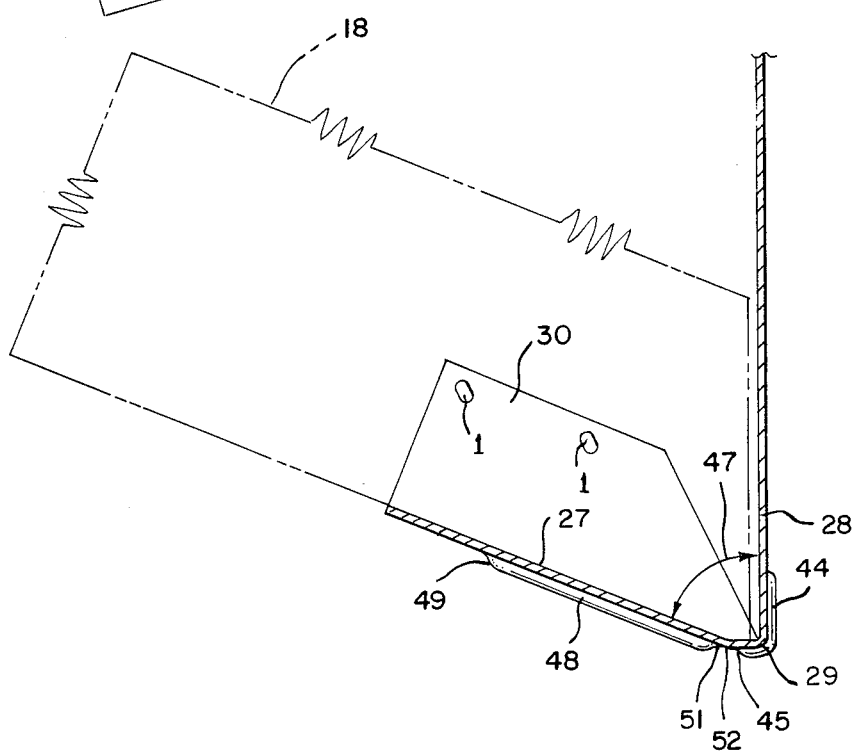
FIG. 15 is a cross sectional view taken in the same portion of the hanger as the view shown in FIG. 13 but showing an alternate form of hanger with an up slope.

Still another form of the hanger is shown in FIGS. 6, 12 and 17 wherein supporting member 16' is sloped at as preselected angle 56 to the horizontal. First and second flange extensions 57 and 58 are integrally connected to respective first and second side support members 25 and 26 and formed with fastener openings 6. The hanger is adapted for attachment to the top face 55 of sloping supporting member 16'.

A sloping bend line 59 shown in FIGS. 6 and 17 is formed in flange extensions 57 and 58 at an acute angle 60 to axis 24 of the hanger is generally equal to the preselected angle 56 of supporting member 16' with the horizontal. The method of making a hanger as previously described as shown in FIG. 4 consists briefly of:

(1) selecting a planar sheet metal member 61 having a length greater than its width and having a longitudinal axis 24 offset from a longitudinal center line 62 creating a first narrow side member 25 and a second wide side member 26;

(2) selecting a back plate area 23 bisected by longitudinal axis 24 and extending along a substantial portion of the misportion of sheet 61;

(3) selecting a first narrow side member area 25 adjacent back plate member 23 bordered by a narrow side bend line 63;

(4) forming an obtuse angle bend 64 at the intersection of back plate plane area 23 and narrow side member area 25 along narrow side bend line 63;

(5) selecting an inner side panel area 36 on second wide side member 26 adjacent back plate plane area 23;

(6) forming a second angle bend 65 at the intersection of back plate 23 and inner side panel 36 along wide-side bend line 98;

(7) selecting an outer side panel area 37 on second wide side member 26 adjacent inner side panel area 36;

(8) forming an angle 39 in second wide side member 26 along a panel bend line 38 at the straight line intersection of inner and outer side panel areas 36 and 37;

(9) cutting a first tab member 32 in the upper portion of back plate plane member 23 and designating a first tab bend line 34 parallel to axis 24 and adjacent narrow side bend line 63;

(10) forming an acute angle bend 66 along first tab bend line 34;

(11) cutting a second tab member 33 in the upper portion of back plate member 23 and designating a second tab bend line 35 parallel to axis 24 in inner side plane area 36;

(12) forming said second tab member parallel to said first tab member;

(13) forming the lower portion 28 of back plate plane member 23 with a width greater than the width of back plate 23;

(14) selecting a seat base 27 connected to lower portion 28 of back plate member 23 and designating a seat bend line 29 at the intersection of seat base 27 and back plate member 23;

(15) selecting a first seat side 30 formed with a fastener opening 1 and connected to seat base 27 along a first seat side bend line 42 in alignment with narrow side bend line 63;

(16) forming a constant right angle bend 67 at the intersection of first seat side 30 and seat base 27 along first seat side bend line 42;

(17) selecting a second seat side 31 formed with a fastener opening 1 and connected to seat base 27 along a variable second seat side bend line 43; and

(18) forming a right angle bend 68 at variable second seat side bend line 43.

The method of making a hanger which skews in a direction opposite to the hanger shown in FIG. 3 and includes the alternate step of; bending all angles in the hanger shown in FIG. 3 in the opposite direction creating a mirror image of the hanger.

The method of making the hanger illustrated in FIG. 1 includes the added steps of:

(1) selecting first and second top flange members 53 and 54 connected to narrow first side support member 25 and second wide side support member 26 respectively; and (2) forming a bend angle 69 along a top flange bend line 70.

The method of making a hanger illustrated in FIG. 2 which skews in a direction opposite to that shown in FIG. 1 and consists of the alternate step of bending all angles in the hanger shown in FIG. 1 in the opposite direction creating a mirror image of the hanger.

The method of making the hanger illustrated in FIG. 6 includes the steps of:

(1) selecting first and second flange extensions 57 and 58 integrally connected to respective first narrow and second wide side support members 25 and 26 and formed with fastener openings 6;

(2) selecting a sloping bend line 59 in first and second flange extensions 57 and 58 at an acute angle 71 to axis 62 of the hanger; and (3) forming a 90° bend 72 at sloping bend line 59.

The method of making a hanger which skews in a direction oposite to the hanger illustrated in FIG. 6 which consists of following the alternate step of bending all angles in the opposite direction creating a mirror image of the hanger.

Figure 16:
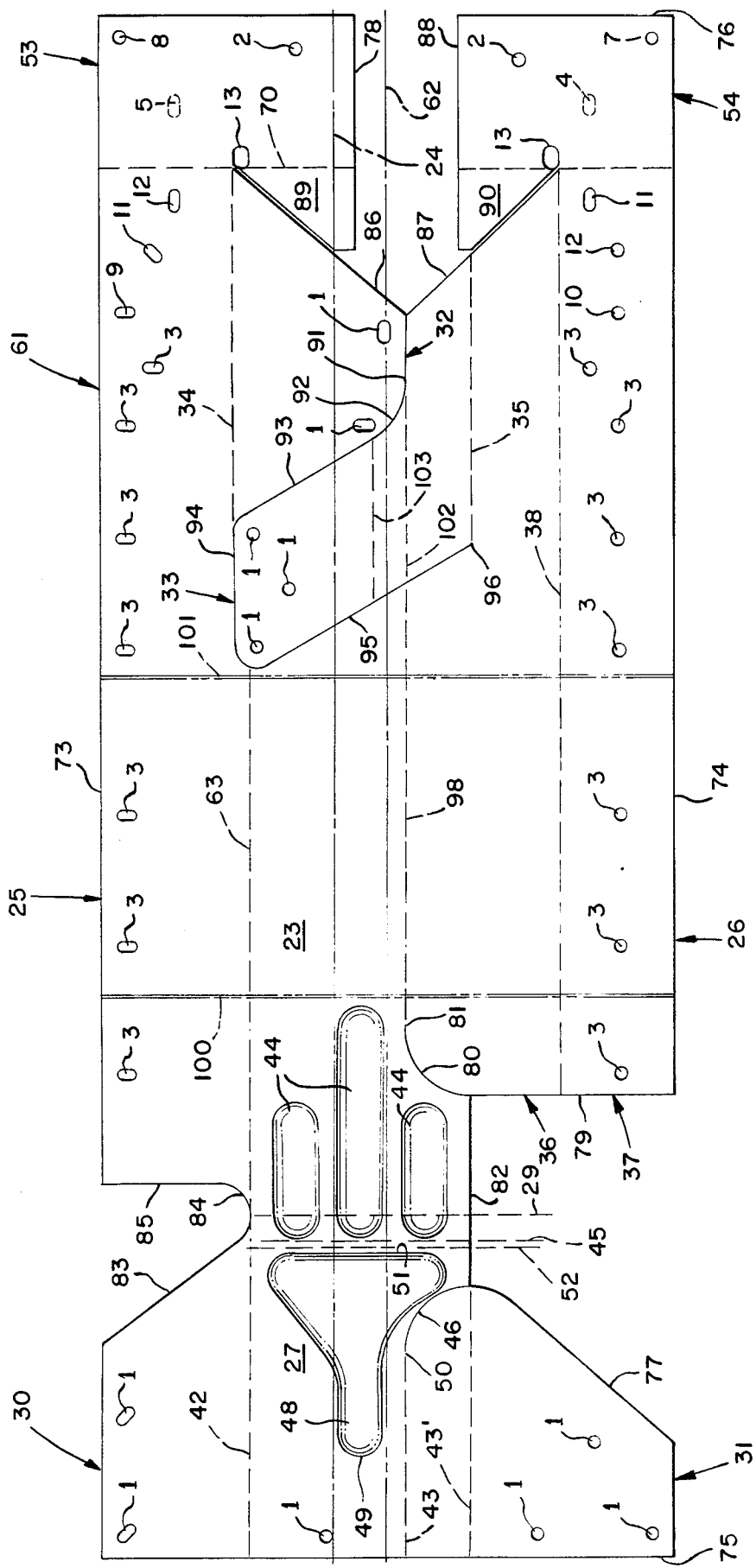
FIG. 16 is a top plan view of a blank from which all of the hangers shown are made except the hanger of FIG. 6.

Referring to FIG. 16 which illustrates the blank from which all of the forms of the hanger illustrated and described may be formed, a coil of sheet metal having sides 73 and 74 is selected and cut at lines 75 and 76. In the seat area, an angle cut line 77 is made with a curved line 46 terminating at point 50. A cut is made along straight line 79, curved line 80 and terminates at point 81. A cut is made along line 82 and the material between lines 77, 46, 79, 80 and 82 is removed. On the other side of the seat, a straight line cut is made along line 83, curved line 84 and straight line 85. The material on the outside of the line is removed.

At the top end of the blank, if a face mounted flange is to be made, the blank is cut along line 70. If the hanger is to be made with a top flange, the blank is cut along lines 76, 78 and 88. In both hangers, cuts are made along straight lines 86 and 87. For face mounted hangers, the metal in areas 89 and 90 is removed. Both tabs may be made by making cuts along straight line 91, curved line 92, straight line 93, straight line 94, and straight line 95, terminating at point 96.

Referring to FIG. 16 which shows the blank, the following schedule of nail holes may be followed:

1. All holes and slots labelled as 1 must exist in all models.

2. All holes and slots labelled as 2, 11 and 12 must exist in all non-tilting top flange models.
3. The holes labelled 6 are used in tilted top flanges only and are shown in FIG. 12.
4. The two holes at the top flange bend line labelled as 13 are for top flange models only.
5. All holes labelled as 3, 9, 10, 11 and 12 exist in all face models.
6. All holes labelled as 4, 7, 9 and 11 are for tilted top flange models in one direction.
7. All holes labelled as 5, 8, 10 and 12 are for tilted top flange models in the opposite direction.

It may be noted in the drawings that some of the fastener openings are circular and some are slotted. The slotted openings are used where due to the angles in the metal or because of the lamination of the supported member controlled slant nailing is required.

Where a slot is shown, a guide tab may also be used to guide the fastener as illustrated in my U.S. Pat. No. 4,291,996. Restricted slot openings are further explained in my U.S. Pat. No. 4,230,416.

Unlike standard stirrup-type hangers, the hinge design of the present hanger requires positioning of the nails in the seat sides. Thus, pre-attachment of the hanger to the supported member is a recommended practice before attaching the hanger to the supporting member.

Examples of models which may be constructed using the present disclosure are as follows:

EXAMPLE 1—FACE MOUNT TYPE

Using 14 gauge metal, 16 penny nail attachment and any slope, skew or width between 2.3" and 3.5" with a load range, ICBO, of about 2500 lbs., three different back plate heights of $11\frac{1}{8}"$, $13\frac{1}{8}"$, and $15\frac{1}{8}"$ are optimum providing 16, 18 and 20 nailing code schedule for the respective heights.

EXAMPLE 2—FACE MOUNT TYPE

Using 12 gauge metal, N20AN nail attachment schedules as set forth and provided by the Simpson Company of San Leandro, Calif., 2.3" to 3.5" seat width, any slope or skew up to 30° in either direction the hanger may be used in the 3,000 ICBO load ranges as controlled by the nailing scheduled.

EXAMPLE 3—TOP FLANGE MODEL

Using 14 gauge, 16 penny or Simpson Company N16 nail schedule, and a $2\frac{1}{4}"$ 90° top flange or 3" maximum added top flange material for any tilted top flange provision up to 30 degrees, and a constant 8 (plus optional provision for 2 nails and added value if wanted) the general ICBO range is 2500 pounds. Assuming a desired die length limit of 36", a maximum back plate dimension of $28\frac{1}{2}"$ for 90° top flange models, and $25\frac{1}{2}"$ back plate dimension for 30° maximum titled top flange models may be achieved. The minimum height is $11\frac{1}{8}"$.

EXAMPLE 4

The dimensions are identical to Example 3 except that 12 gauge metal is used and a Simpson Company N20AN nail schedule is used to achieve a 3000 plus ICBO load range.

EXAMPLE 5

The dimensions are identical to Example 4 except that the hanger can be used in the ICBO 4000 pound load range by the addition of face nails on 4" nominal, or greater, top flange mount situations. In like manner, all top flange models may carry greater loads if additional nails are driven through the side support members.

Figure 7:
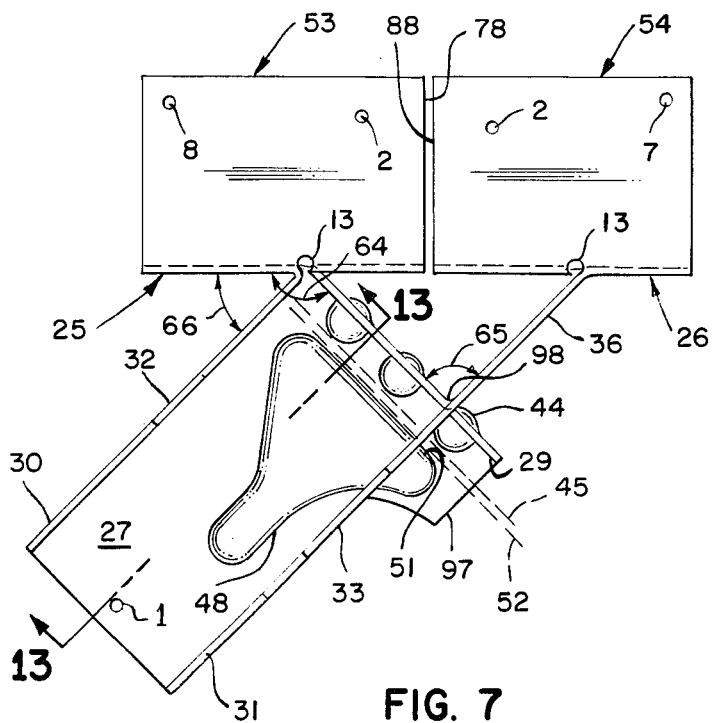
FIG. 7 is a top plan view of the hanger shown in FIG. 1 taken along line 7—7.

Referring to the left skewed top flange hanger illustrated in FIGS. 1 and 7 and made from the blank shown in FIG. 16, it is to be understood that the hanger may be skewed at any angle from 0° to approximately 30° as shown. Further the hanger may be sloped up or down at an infinite number of angles between approximately 30° down to about 30° up by bending the seat along bend line 52 in the field. Different width supported members may be attached with the present hanger by varying the width of the seat from the position shown on bend line 43 on an infinite number of bend lines until the side member 31 is parallel to seat edge 97.

Different skew angles are achieved by varying the bend angles at angles 39, 65 and 64. Note that first side support 25 and outer side panel 37 always remain parallel to each other and flush to the face of the supporting member. The hanger is formed with top flange member 53 and 54 which are separated by a cut out area defined by cut lines 78 and 88 as shown in FIG. 16. As bends are created along bend lines 63, 98 and 38, the top flanges are drawn closer together as shown in FIG. 7. Downward flange areas 89 and 90 need not be removed and contribute to the re-bend strength of the flange.

The nail holes 1 in the seat sides are located near the outer edge to provide as much moment arm as possible. Since the seat carries no stirrups attached to the back, the nails primarily carry the seat load. Note that the seat at bend line 29 is wider than seat 27. This relationship is necessary since it has been found that at heavier loads the critical part of the design is the width of the seat at the intersection of the seat and the lower back plate 28. The second tab 33 is in alignment with inner panel 36 for the hanger shown. For wider supported members, bends would be made along bend line 35 and auxiliary bend line 103 shown in FIG. 16. Note that tab 33 slants downwardly. This relationship provides greater tab holding of the carried member.

Figure 8:
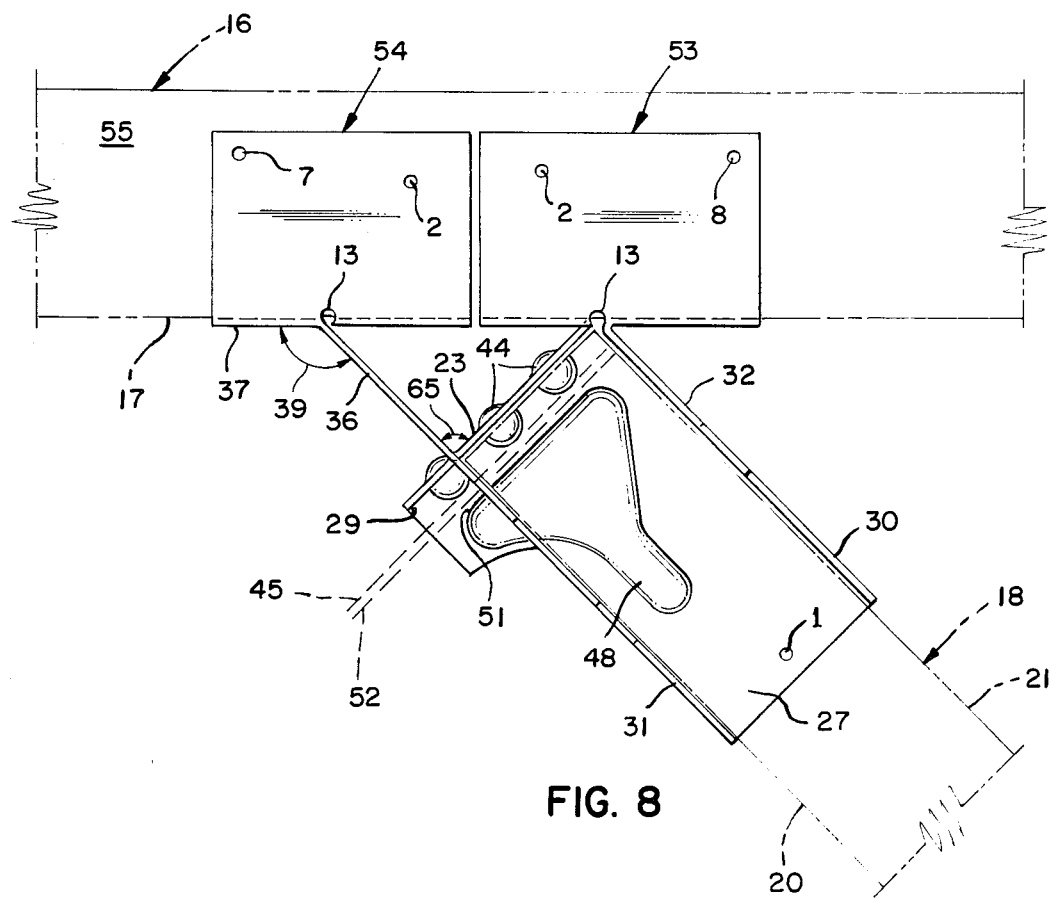
FIG. 8 is a top plan view of the hanger shown in FIG. 2 taken along 8—8.

As previously described, FIGS. 2 and 8 illustrate a hanger which is the mirror image of the hanger illustrated in FIGS. 1 and 7. It is believed that this is the first use of mirror imaging to obtain a right skew hanger in a hanger which is asymmetrical.

Figure 9:
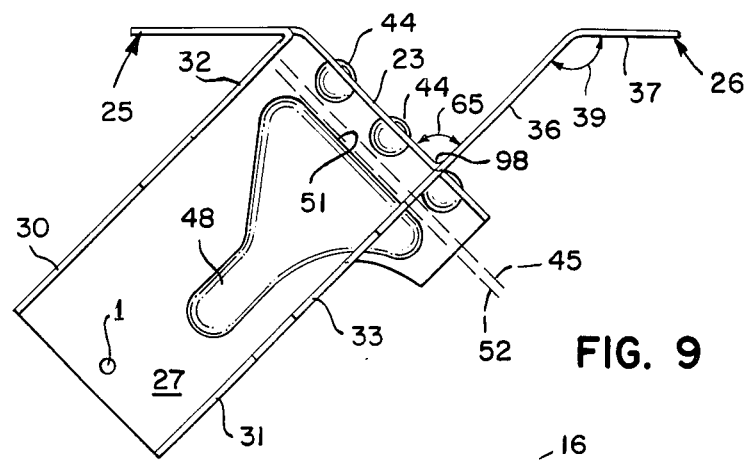
FIG. 9 is a top plan view of the hanger shown in FIG. 3 taken along line 9—9.

FIGS. 3 and 9 illustrate a left skewed face mounted hanger. Note the use of additional nail openings 3 to attach the side members 25 and 26 to the supported member.

Figure 10:
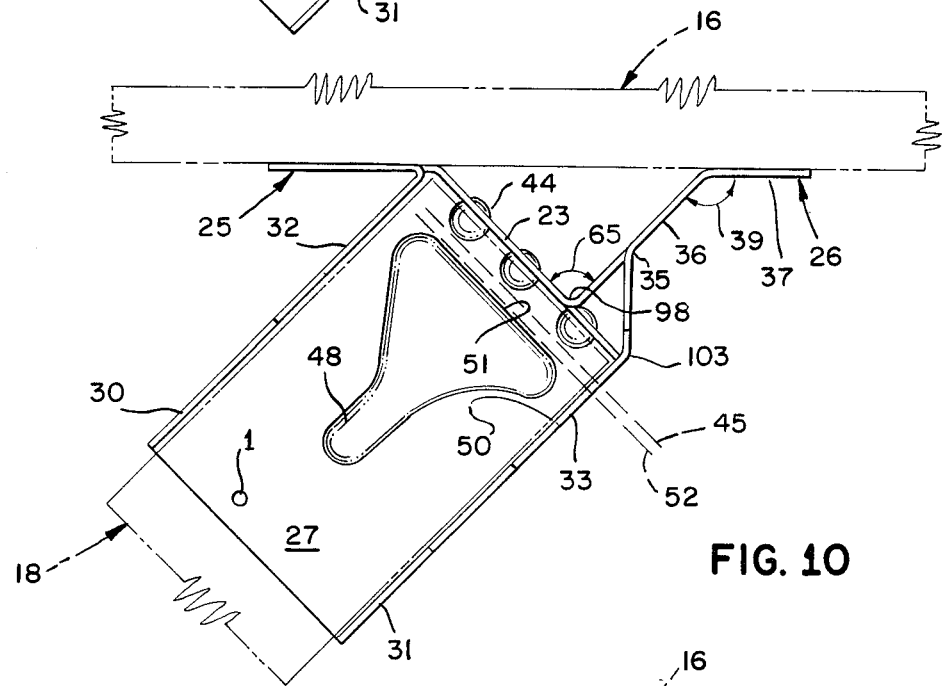
FIG. 10 is a top plan view of the hanger shown in FIG. 4 taken along the line 10—10.

The hanger illustrated in FIGS. 4 and 10 is a left skewed face mounted hanger. Note the fact that the seat has been widened and the second tab 33 has been bent along bend line 35 and auxiliary bend line 103. The angle of bend varies with the thickness of the supported member. As previously stated, this hanger could be bent in the field along line 52 to either slope down an infinite number of angles to approximately 30° or bent upwardly an infinite number of angles to approximately 30°.

Figure 11:
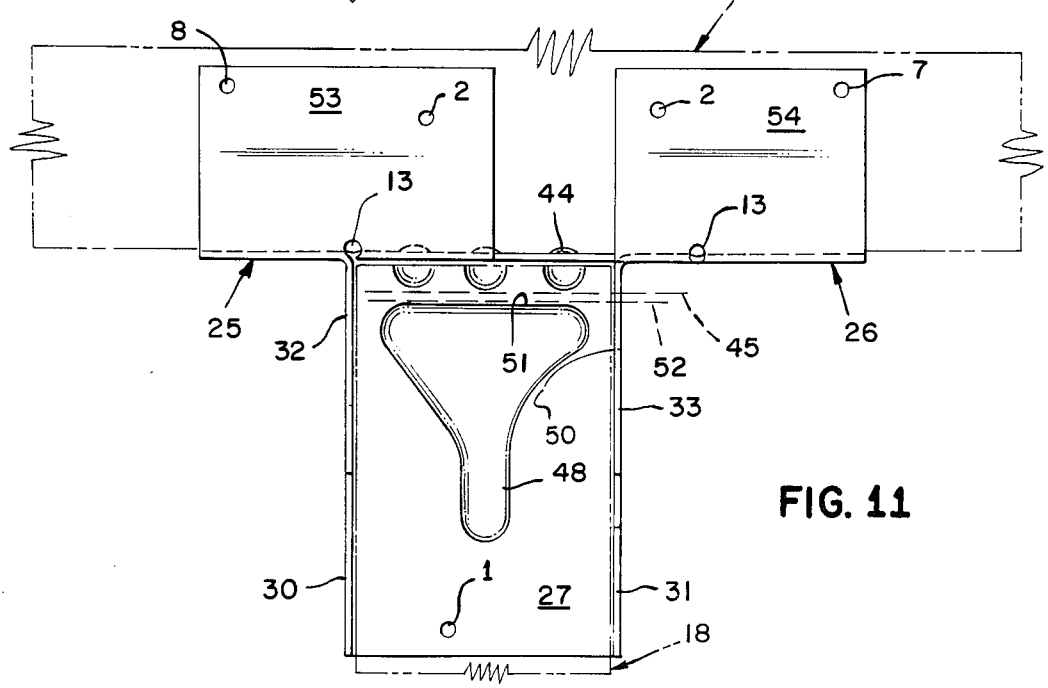
FIG. 11 is a top plan view of the hanger shown in FIG. 5 taken along line 11—11.

FIGS. 5 and 11 illustrate the present hanger in a 0° skew configuration. While other hangers could be used, the present hanger offers the unique advantage that the same blank may be used to carry supported members of different widths. Using the present single sheet metal blank, a great many blanks could be pre-cut and inventoried. When an order was received, the custom ordered seat width could be made on the bending equipment; thus shortening the time needed to fill special orders. In like manner, all of the hangers illustrated can be pre-cut and punched and then inventoried until an order for a particular, skew, and width is obtained. Note that the second tab is bent along tab bend line 35 and no bend is made at auxiliary bend line 103 since the tab is set for the maximum width carried member. For narrower carried members, there is an option of making bends at bend lines 35 and 40 or simply moving bend line 35 inwardly.

FIGS. 6, 12 and 17 illustrate a left skewed tilting top flange hanger. As with the other hanger described, the seat is hinged and could be sloped either up or down a maximum of approximately 30°. This hanger is used to attach purlins to sloping roof hips or other sloped supporting members. The hanger illustrated truly represents the ultimate in "customized" requirement hangers for it represents one of literally hundreds of different variations that can actually be made using the same basic blank. To be able to custom design and weld even a few different seat widths, skew angles and top fange tilt angles represents an intolerable manufacturing problem. With the present design, however, the blanks can be pre-cut and inventoried and then the hangers can be quickly and easily bent to a customers particular requirements. Lead time can be reduced, and the task of individually engineering each different hanger can be eliminated. Most importantly, the costly and time consuming production problem of hand welding each hanger is eliminated.

The top flanges have been indicated by the numbers 53' and 54' since they are constructed from extensions 57 and 58.

Referring to FIG. 16, in order to make hangers of different height, spacers of different lengths are inserted in the die between double phantom lines 100 and 101.

At all skew angles other than a 45° angle there is a further bend line in second tab member 33 which occurs as shown in FIGS. 16 and 17 along indicated phantom line 102. By making the bend along line 102, second tab member 33 is always at a 90° angle to back plate member 23.

I claim:

1. An asymmetrical sheetmetal slope and skew hanger connector in a frame building structure comprising:
   a. a wood supporting member having a generally planar front face and right angularly related planar top face;
   b. a wood supported member having a generally planar end face, generally planar side portions intersecting said end face, and a bottom edge face;
   c. an elongated back plate member having a longitudinal center line axis dividing said back plate into equal transverse widths and a face adapted for parallel registration with said front face of said wood supporting member;
   d. first and second side support members integrally attached to opposite sides of said back plate, formed with a plurality of fastener openings and adapted for connection to said face of said supporting member and said first side support member having a width less than the width of said second side support member;
   e. a seat base integrally connected to an end of said back plate along a transverse seat bend line and extending angularly therefrom a selected distance and having a face adapted for parallel registration with said bottom edge face of said wood supported member;
   f. first and second seat sides integrally connected to opposite sides of said seat base along a first fixed seat side bend line and a second variable seat side bend line and extending generally parallel to each other and angularaly to said seat base and each formed with fastener openings at a selected distance from said seat bend line and from said seat base and adapted for connection to said side portions of said wood support member;
   g. a transverse cut formed in said seat base longitudinally spaced from said transverse seat bend line and extending from said second seat side and intersecting said variable seat bend line permitting said hanger to hold a wood supported member having a width less than said transverse seat bend line; and
   h. a first tab member formed from said back plate member, connected to said first side support member along a variable first tab bend line adjacent said back member and a second tab member formed from said back plate member and said second side support member and connected to a portion of said second side support member along a second tab bend line and both of said tab members extending generally parallel to each other and angularly to said back member and each formed with fastener openings at selected distances from said back plate and adapted for connection to said side portions of said wood supported member.

2. A hanger as described in claim 1 wherein:
   a. said second side support member has a width greater than the width of said first side support member and is divided into inner and outer side panels;
   b. said outer side panel is formed with said fastener openings and is adapted for connection to said face portion of said wood supporting member; and
   c. said inner panel is connected to said outer panel along a panel bend line parallel to said longitudinal axis of said back plate member and is connected to said back panel member along a portion of its length.

3. A hanger as described in claim 2 comprising:
   a. said inner and outer side panels are formed at a selected angle at said panel bend line; and
   b. said first side support member and said outer side panel are formed on a plane parallel to said front face of said wood supporting member for flush mounting there against.

4. A hanger as described in claim 2 wherein:
   a. said second tab is formed with an auxiliary bend line which is parallel to said variable second tab bend line and located a selected distance therefrom.

5. A sheetmetal slope and skew hanger connector in a frame building structure as described in claim 1 comprising:
   a. said wood supporting member having a generally planar top face; and
   b. first and second top flange members connected respectively to said first and second side support members and formed with fastener opening and adapted for attachment to said top face of said supporting member.

6. A hanger as described in claim 1 wherein said wood supporting member is sloped at a preselected angle to the horizontal comprising:

a. first and second flange extensions integrally connected to said respective first and second side support members and formed with fastener openings and adapted for attachment to the top edge of said sloping supporting member; and
b. a sloping bend line formed in said flange extensions at an acute angle to said axis of said hanger generally equal to the preselected angle of said supporting member with the horizontal.

7. An asymmetrical slope and skew hanger connector in a frame building structure comprising:
a. a wood supporting member having a generally planar front face;
b. a wood supported member having a generally planar end face, generally planar spaced side portions intersecting said end face, and a bottom edge face;
c. an elongated back plate member having upper and lower face portions and adapted for parallel registration with said front face of said wood supporting member;
d. first and second side support members integrally attached to opposite sides of said back plate, formed with a plurality of fastener openings and adapted for connection to said front face of said wood supporting member;
e. a variable width seat base integrally connected to an end of said back plate along a selected angle at said transverse seat bend line and extending angularly therefrom a selected distance and having a face adapted for parallel registration with said bottom edge face of said wood supported member;
f. first and second seat sides integrally connected to opposite sides of said seat base along a first fixed seat side bend line and a second variable seat side bend line and extending generally parallel to each other and angularly to said seat base and each formed with fastener openings at a selected distance from said seat bend line and from said seat base and adapted for connection to said side portions of said wood supported member;
g. a first tab member integrally connected to said first side support member and a second tab member formed from said back plate member and said second side support member and connected to a portion of said second side support member along a second tab bend line and both said tab members extending generally parallel to each other and angularly to said back plate member and each formed with fastener openings at selected distances from said back plate member and adapted for connection to said side portions of said wood supported member;
h. said transverse seat bend line having a width greater than the effective width of said seat base;
i. said first seat side is connected to said seat base along said first fixed seat bend line;
j. said second seat side is connected to said seat base along said second variable seat bend line; and
k. said second variable seat bend line is parallel to said first seat bend line and is selectably located a distance from said first fixed seat bend line corresponding to the distance between said planar side portions of said wood supported member.

8. A hanger as described in claim 7 comprising:
a. said lower portion of said back plate is formed with a plurality of transversely spaced axially extending fixed seat bend line embossments which extend across said transverse seat bend line and terminate in a generally straight selected transverse line in said seat base adjacent said transverse seat bend line;
b. said second seat side having an inner edge terminating at said second variable seat bend line and outwardly of said transverse seat bend line;
c. a seat embossment formed in said seat base extending from a distal point in said seat base, extending past said intersection of said second seat side and said seat base and terminating in an elongated seat embossment transverse line spaced from and parallel to said transverse seat bend line; and
d. a field bend line extending transversely of said seat base located between and parallel to said transverse seat bend line and said elongated seat embossment transverse line.

* * * * *